(12) United States Patent
Jaccino et al.

(10) Patent No.: US 8,995,639 B1
(45) Date of Patent: Mar. 31, 2015

(54) SYSTEM, METHOD AND DEVICE FOR PROVIDING A CALL DIVERSION APPLICATION THAT SENDS CALLS DIRECTLY TO THE CALL COMPLETION SERVICE BYPASSING THE CALLED PARTY

(71) Applicant: Cox Communications, Inc., Atlanta, GA (US)

(72) Inventors: Michael Colin Jaccino, Atlanta, GA (US); Francisco Gonzalez, Atlanta, GA (US); Compton Wharton, Jr., Duluth, GA (US); Michael Anthony Clark, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 11 days.

(21) Appl. No.: 13/688,082

(22) Filed: Nov. 28, 2012

Related U.S. Application Data

(63) Continuation-in-part of application No. 13/402,625, filed on Feb. 22, 2012, now abandoned.

(51) Int. Cl.
*H04M 3/42* (2006.01)
*H04M 3/533* (2006.01)
*H04M 3/54* (2006.01)

(52) U.S. Cl.
CPC .............. *H04M 3/533* (2013.01); *H04M 3/54* (2013.01)
USPC .................................. 379/211.01; 379/212.01

(58) Field of Classification Search
CPC ......... H04M 1/57; H04M 3/436; H04M 3/54; H04M 3/46; H04M 3/465; H04M 3/58
USPC ............. 379/142.07, 211.01, 211.02, 211.03, 379/211.04, 212.01
See application file for complete search history.

(56) References Cited

U.S. PATENT DOCUMENTS

| | | |
|---|---|---|
| 4,117,270 A | 9/1978 | Lesea |
| 4,277,649 A | 7/1981 | Sheinbein |
| 6,775,546 B1 | 8/2004 | Fuller |
| 8,270,582 B1 | 9/2012 | Kirchhoff et al. |
| 2003/0138081 A1 | 7/2003 | Burgard et al. |
| 2003/0215078 A1 | 11/2003 | Brahm et al. |
| 2004/0202305 A1 | 10/2004 | Brennan |
| 2007/0153999 A1* | 7/2007 | Daigle ..................... 379/142.07 |
| 2008/0002820 A1 | 1/2008 | Shtiegman et al. |
| 2009/0154681 A1 | 6/2009 | Kung et al. |
| 2010/0110992 A1 | 5/2010 | Hu et al. |
| 2010/0310062 A1 | 12/2010 | Srinivasan et al. |
| 2011/0293085 A1 | 12/2011 | Imaguchi |

* cited by examiner

*Primary Examiner* — Simon King
(74) *Attorney, Agent, or Firm* — Merchant & Gould P.C.

(57) ABSTRACT

A calling party is connected to a system of a called party without the calling party reaching the called party. A call diversion is triggered when a request to access a call diversion application is received. In response to receiving the request, the call diversion application at the direct-to-diverted call completion service server initiates a first call and a second call to a called party. The call diversion application detects when the second call is connected to a call completion system. In response to detecting when the second call is connected to a call completion system, the first call is terminated.

20 Claims, 5 Drawing Sheets

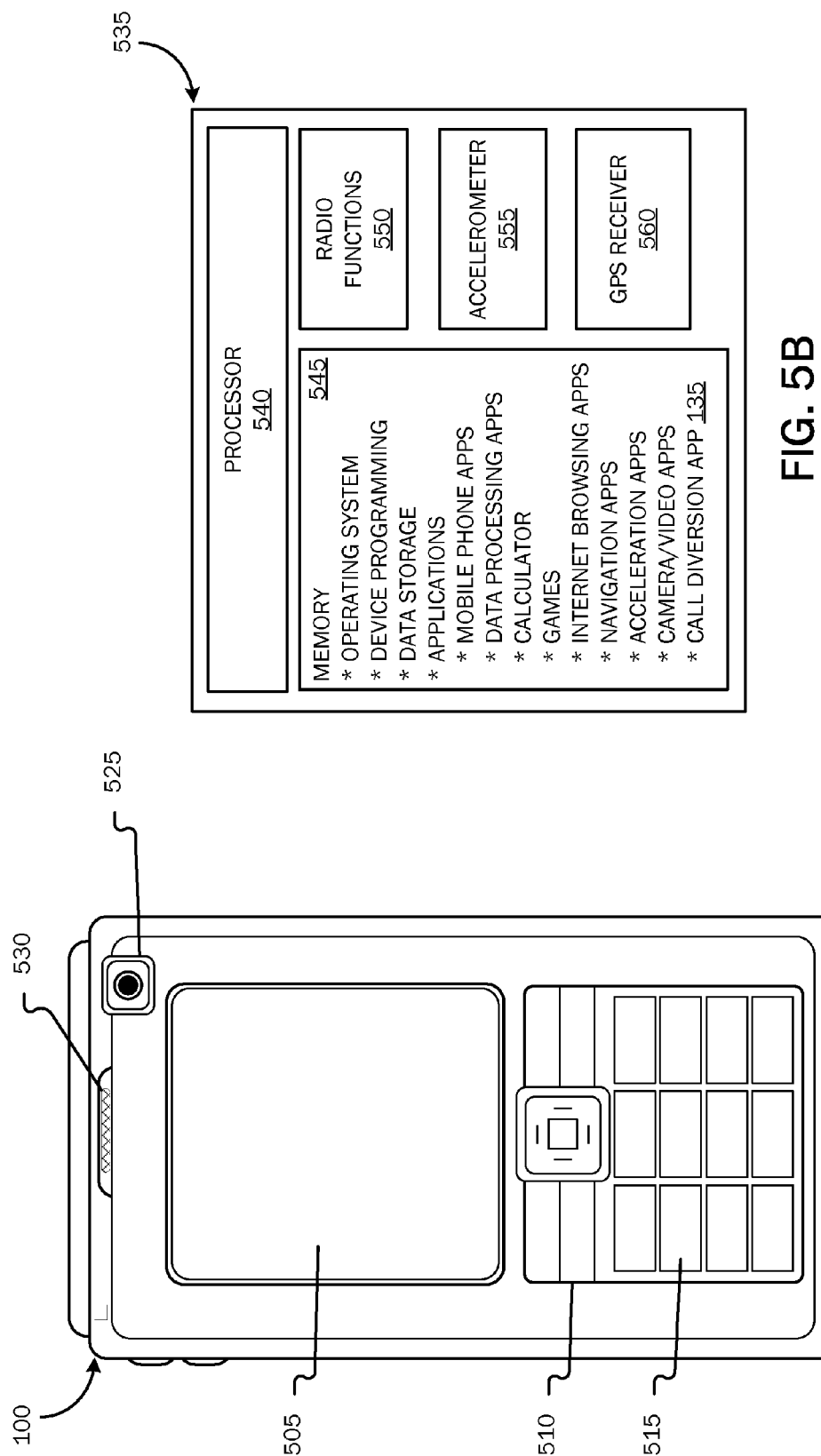

SYSTEM, METHOD AND DEVICE FOR PROVIDING A CALL DIVERSION APPLICATION THAT SENDS CALLS DIRECTLY TO THE CALL COMPLETION SERVICE BYPASSING THE CALLED PARTY

CROSS-REFERENCE TO RELATED APPLICATIONS

This patent application is a continuation-in-part of U.S. patent application Ser. No. 13/402,625 filed Feb. 22, 2012, and titled "System, Method and Device for Providing a Call Diversion Application That Sends Calls Directly to the Call Completion Service Bypassing the Called Party," the disclosure of which is expressly incorporated herein, in its entirety, by reference.

FIELD OF THE INVENTION

This disclosure relates in general to reaching a call completion system of a called party without actually reaching the called party, and more particularly to providing a call diversion application that diverts calls directly to the call completion service.

BACKGROUND

It has become practice among telephone service operators to provide value enhancing features to their customers. Two such features, voicemail and fax deposit, can be associated with a customer's telephone line. For example, many telephone systems provide functionality intended to divert calls to ensure satisfactory call completion. Instead of presenting a caller with busy tones, endless ringing, or some other signal indicating that the caller will not be connected with the called party, telephone system operators provide call completion services like voicemail, which allows the caller to leave a message to be retrieved at a later time by the called party.

To invoke call diversion, telephone operators rely most heavily on two features: Call Forward No Answer (CFNA) and Call Forward Busy (CFB). In Call Forward No Answer, the telephone system allows the caller ring tones for a set duration, typically the duration that the called party's phone is made to ring, before diverting the caller to the call completion service. In Call Forward Busy, the telephone system detects that the telephone line is already in use, forwarding the caller to the call completion service immediately. More specifically, when a caller makes a call to a called party and the called party is using the telephone, the calling party is switched to a call processing system that answers the telephone, e.g., a voice mail system.

Some voicemail systems provide fax functionality. In these systems, a user can send a fax using a telephone number of a customer and the voicemail with the fax functionality. The voicemail system receives the call and allows a fax message to be deposited. However, since this functionality is associated with the main voice number of the customer, a fax depositor would first need to call the customer and ask the customer to not answer the phone until the fax has been deposited. This behavior is clumsy, and it helps to undermine the value of the fax feature for some users. Similarly, users sometimes only want to leave a voicemail rather than talk to the owner of the voicemail account. Thus, the caller would prefer to communicate with the call processing system so that the caller can immediately leave a voicemail or deposit a fax. Present technologies leave control entirely in the hands of the called party because the called party makes the decision whether to take the call.

Accordingly, there is a need to bypass the called party and connect with the call processing system associated with the called party.

SUMMARY OF THE INVENTION

To overcome the limitations described above, and to overcome other limitations that will become apparent upon reading and understanding the present specification, embodiments for providing a call diversion application that diverts calls directly to the call completion service are disclosed.

The above described problems are solved by a call diversion system that enables the calling party to bypass the called party and call directly into the call completion system, such as a voicemail system. By making two or more telephone calls in parallel, the technique ensures that if the Call Forward Busy function is enabled, it will trigger a call diversion. Because the called party's telephone system treats the line as busy by the first call it received, it may divert any calls received immediately afterward to the call completion service.

In one embodiment, a method for a calling party to reach a system of a called party without reaching the called party is disclosed. The method includes receiving, at a Direct-to-Diverted Call Completion Service(Direct-to-DCCS) server, a request to access a call diversion application, in response to receiving the request, initiating, by the call diversion application at the Direct-to-DCCS server, a first call and a second call to a called party, detecting when the second call is connected to a call completion system and in response to detecting when the second call is connected to a call completion system, terminating the first call.

In another embodiment, a system for enabling a calling party to reach a system of a called party without reaching the called party is disclosed. The system includes a communications network for providing call signaling and messaging to user communication devices and a Direct-to-DCCS server, coupled to the communications network, for receiving a request to access a call diversion application to connect a calling party to a call completion system of a called party without reaching the called party, wherein the call diversion application initiates a first call and a second call to a called party in response to receiving the request, detects when the second call is connected to a call completion system and, in response to detecting when the second call is connected to a call completion system, terminates the first call.

In another embodiment, a computer readable medium including executable instructions which, when executed by a processor, connects a calling party to a system of a called party without connecting with the called party is disclosed. The executable instructions includes receiving, at a Direct-to-DCCS server, a request to access a call diversion application, in response to receiving the request, initiating, by the call diversion application at the Direct-to-DCCS server, a first call and a second call to a called party, detecting when the second call is connected to a call completion system and in response to detecting when the second call is connected to a call completion system, terminating the first call.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIGS. 5a-b illustrate a suitable mobile computing environment, for example, a mobile computing device, a smart phone, a tablet personal computer, a laptop computer, and the like, with which embodiments may be practiced.

DETAILED DESCRIPTION

Embodiments of the present invention are directed to enabling the caller to bypass the called party and call directly into the call completion system, such as a voicemail system. Thus, some of the control of how the call is handled is transferred to the caller.

To provide value enhancing features for customers, voicemail and fax deposit systems are associated with a telephone line of a customer such that the system are accessed by a caller only after the call has been diverted from the called telephone to a call processing/completion system. The call processing system normally completes the call when the telephone customer cannot receive it. For the caller, this means that the called party may have the opportunity to receive the call prior to call diversion, even if the caller wishes to be sent directly to voicemail or to the fax deposit service for the called party. In some cases the caller may wish to deposit a voicemail or fax without the risk of having the called party picking up the telephone, interrupting the deposit.

Using the Call Forward Busy function of telephone systems, a call may be diverted to the call completion service, even if the called party is available to take the call. Two or more telephone calls may be made by the called party, or by a system on the called party's behalf, to cause the called party's telephone system to begin treating the line as busy by the first call it receives, then divert any calls received immediately afterward to the call completion service.

Figure 1:
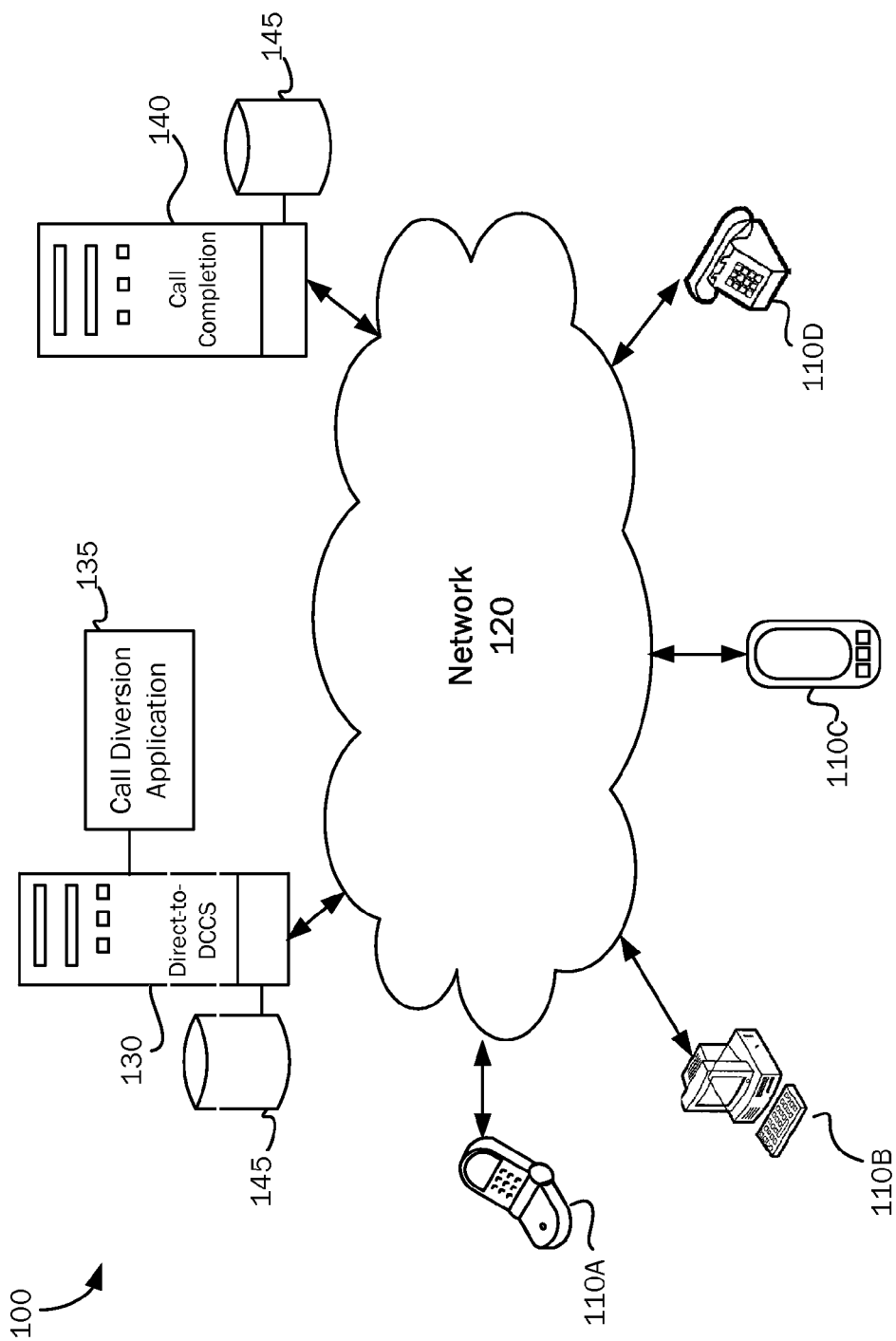
FIG. 1 illustrates a communication network that connects communication devices to a call diversion application and to a call completion server over a network according to one embodiment.

FIG. 1 illustrates a communication network 100 that connects communication devices to a Direct to Diverted Call Completion Service (Direct-to-DCCS) server 130 comprising a call diversion application 135 and to a call completion server 140 over a network 120 according to one embodiment. With reference to FIG. 1, servers 130 and 140 are connected to multiple user devices 110A-110D over network 120. User devices 110A-110D may include various types of communication devices, such as land-line telephone 110D, mobile computing devices such as a smart phone 110C, a cellular phone 110A, and a personal computer 110B. Furthermore, while the servers 130 and 140 are shown connected to user devices 110A-110D over the same network, it would be understood by one skilled in the art that the servers 130 and 140 may include multiple network interfaces to communicate with user devices 110A-110D on various and disparate networks. Thus for example, a mobile computing device 110C may communicate with a land-line telephone 110D, and the server 140, making use of call profiles stored in a database 145, may provide call completion services to either party because it is connected to both networks. In addition, all devices, represented by 110A-110D, may communicate with the server 130 to enable direct communications with the server 140, making use of the stored profiles in database 145.

As a convenience, all future references to a "call" will represent any communication attempt, such as a phone call, a voice over IP communication or any communication bridging multiple services. Non-telephonic communication systems may offer similar sets of services including analogous forms of away messages, voicemail, and ring-back. The caller and destination are not required to use the same communication service. For example, a VoIP phone can easily communicate through the network 120 with a cellular phone or a landline telephone.

As shown in FIG. 1, the Direct-to-DCCS server 130, may be implemented separately; however, the service can also be implemented within the telephone system network 120. Many different telephone features have become familiar to telephone users, such as call forwarding, three-way calling, call waiting, etc. These features traditionally have relied on telephone switches in the network 120. As telephone systems have evolved, these features have been abstracted into other elements of a telephone system, such as application servers 130 and 140. Application servers are engaged as a call is created on a rules basis.

User devices 110A-110D may access the call diversion application 135 in several ways, e.g., using the Direct-to-DCCS server 130. The features for diverting a call may be implemented as a future access code, may be provided as a feature button on a special handset, or may be provided through an interaction where the calling party is asked whether the calling party wants to complete the call or be diverted to a call completion system 140. The telephone system network 120 uses two types of communications to complete a call. Signaling is the information that controls and manages the call, while messaging is the content that is being exchanged between users, servers, and networks that are connected to or included within the network 120. Those skilled in the art recognize that the Direct to DCCS server 130 may be configured to detect signaling alone or signaling and bearer communication. By processing bearer traffic, the audio data may be inspected to determine whether or not a call completion system 140 has been contacted also.

Figure 2:
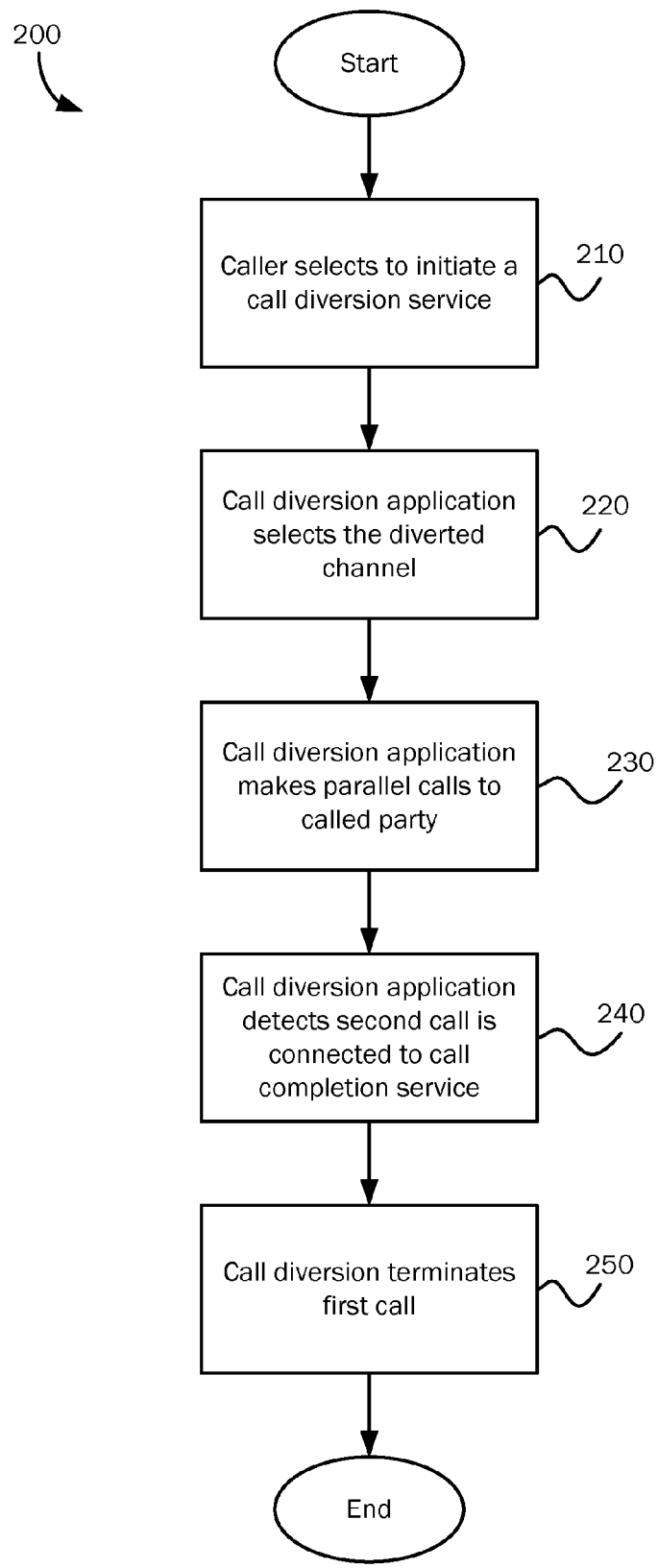
FIG. 2 provides a block diagram of the high order process for diverting calls to a call completion system according to one embodiment.

FIG. 2 provides a block diagram 200 of the high order process for diverting calls to a call completion system according to one embodiment. The calling party selects to initiate a call bypass service, for example the Direct-to-DCCS system, (210) to avoid connecting with the called party's telephone. The call diversion application 135 is used to select the diverted channel (220). The call diversion application 135 invokes calls toward the called and calling party, identifies the successfully diverted call, and terminates all other calls toward the called party. Thus, by the call diversion application 135 making multiple calls in parallel (230), the technique ensures that if the Call Forward Busy is enabled on the called party's line, it will trigger a call diversion. The system managing the parallel calls will be responsible for detecting the diverted call (240) and ending the call that would otherwise have terminated at the party's telephone (250), which should ring very briefly or not at all. The calling party's telephone system may provide the ability to access the telephony network to the calling party. The called party's telephone system may provide for the called party's access to the telephony network, as well as for call diversion. The called party's Call Completion System 140 provides services such as voicemail, videomail and fax deposit.

There are several methods that may used by the call diversion application 135 to select the diverted call. Since the call diversion application 135 may have limited information about the disposition of an in-progress telephone call at any part of the process, the call diversion application 135 may have to rely on a combination of methods.

A first method involves parallel dialing with timed interval. The first method relies on the call diversion application 135 leaving a time interval between the first call and one or more subsequent calls. When best tuned, the first method increases the likelihood that the calling party's telephone system will route the first call to the called party's telephone. The subsequent calls will be more likely to be diverted.

A second method involves inference based on signaling order or timing. The second method relies on the order in which signaling responses from the called party's telephone system are received. The signal order would depend on the method of integration by the call diversion application 135 to the telephony system. If the call diversion application 135 can see that a call is in a "ringing" state while a second call has been completed, the second call is the diverted call.

A third method involves inference based on signaling content. In some cases, the signaling provided to the call diversion application 135 may provide explicit notification of call diversion. In other cases, differences in the signaling between two calls during the same phase of call setup may provide a clear indication of call diversion.

A fourth method involves detection based on audio content, thus a bearer-based audio detection method. In the fourth method, the call diversion application 135 may detect a ring tone in the audio of a channel. In such a case, any parallel calls in the middle of the call setup process would very likely be diverted, as would any calls already completed, but for which a ring tone was not detected.

The effectiveness of the above methods depends on the call diversion application 135 successfully detecting a diverted channel. In a case where the system either failed or detected diversion channel too slowly, the called party would likely experience ringing and potential to receive the call.

Figure 3:
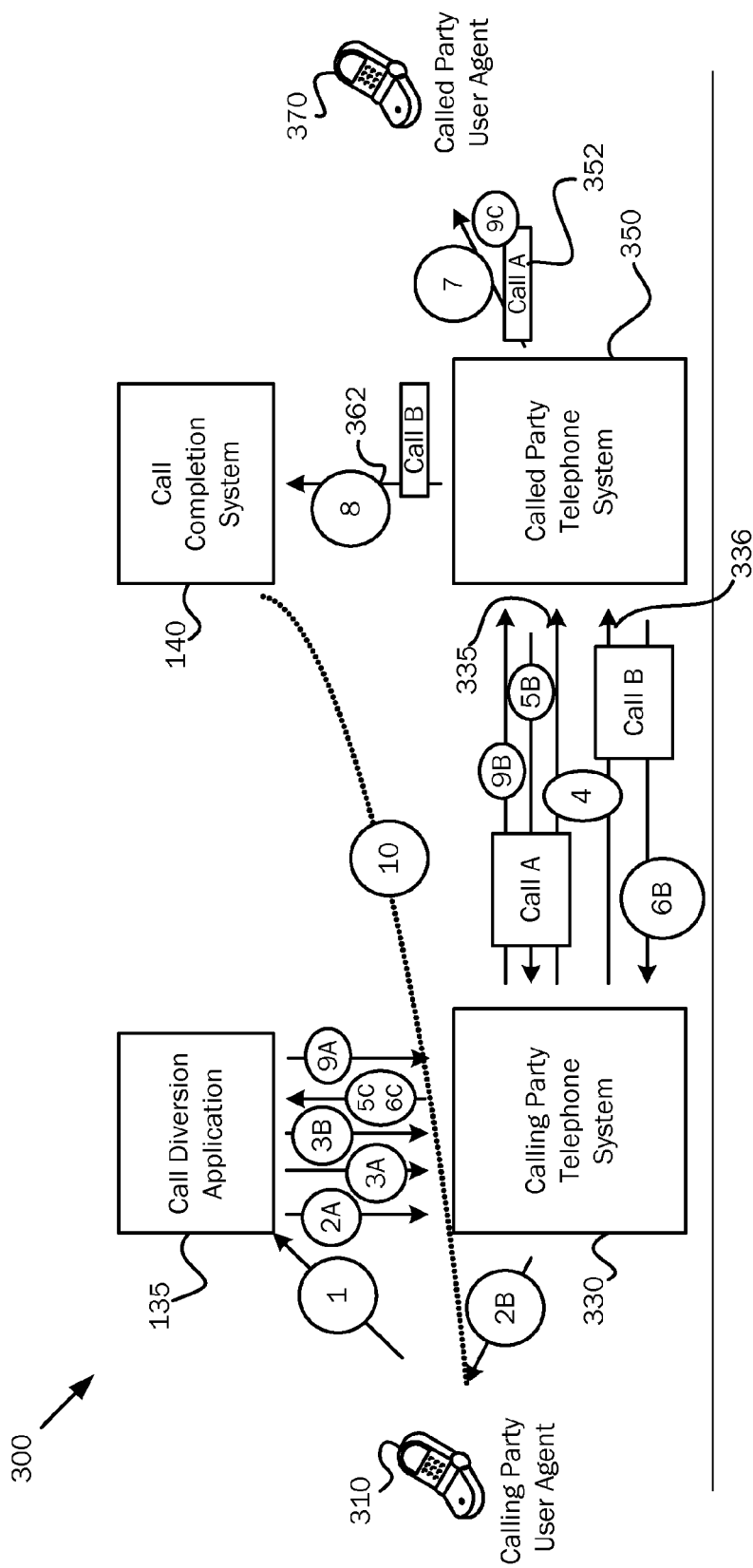
FIG. 3 provides a detailed process of diverting a call directly to the call completion system according to one embodiment.

FIG. 3 provides a detailed process of diverting a call directly to the call completion system 140 according to one embodiment. The steps may be as follows. The calling party user agent 310 signals (1) to the call diversion application 135, providing the calling party number, the called party number, and the desire to terminate with the called party's Call Completion System 140 rather than completing with the called party's user agent 370. The call diversion application 135 signals (2A) to the Calling Party Telephone System 330 to begin a call to the Calling Party User Agent 310. The Calling Party User Agent 310 is notified of an incoming call (2B) so it picks up and hears ringing. The call diversion application 135 signals (3A) to the Calling Party Telephone System 330 to initiate a first call 335 to the Called Party 350 (Call A). The call diversion application 135 signals (3B) to the Calling Party Telephone System 330 to initiate a second call 336 to the Called Party 350 (Call B). Thus, the Calling Party Telephone System 330 separately routes Call A and Call B (4) to the Called Party Telephone System. The Called Party Telephone System 350 sees that the Called Party 370 is not busy and allocates resources to deliver the call (call A) 352 to the Called Party User Agent 370. Within the system, the Called Party state becomes busy. The Called Party Telephone System 350 may signal (5B) to the Calling Party Telephone System 330 that the request has been made and is in progress. The methods for doing so vary, and include SS7, SIP, SMDI, and Channel-associated Signaling. Depending on the information known and integrations present, the Calling Party Telephone System 330 may signal (5C) the new state of the call (call A) to the call diversion application 135. From this point on, the call diversion application 135 has a continuous relationship with the call, and may get a variety of information, both as part of signaling or of a media bearer channel. Regarding call B 336, the Called Party Telephone System 350 sees that the Called Party is busy and invokes the Call Forward Busy feature provisioned for the telephone line. Associated with the Call Forward Busy feature of the Called Party Telephony System 350 are configurations for where to divert the call. The Called Party Telephone System 350 may signal (6B) to the Calling Party Telephone System 330 that the request has been made and is in progress. Once again, the methods for doing so vary, and include ISUP, SIP, SMDI, and Channel-associated Signaling. Additionally, the method may include explicit or inferable information that the call (call B) has been diverted. Depending on the information known and integrations present, the Calling Party Telephone System 330 may signal (6C) the new state of the call to the call diversion application 135. From this point on, the call diversion application 135 has a continuous relationship with the call, and may get a variety of information, both as part of signaling or of a media bearer channel. At this point in the flow, the call diversion application 135 is in a race with the Called Party Telephone System 350 to detect the diverted call (call B) before the Called Party Telephone System 350 informs the Called Party User Agent 370 and begins ringing the phone. During this step, the Called Party Telephone System 350 proceeds with the process of ringing the telephone (7). The Called party Telephone System 350 diverts (8) the call (call B) to the Call Completion System. The call diversion application 135 detects the diverted call 362 and signals (9A) to the Calling party Telephone System 330 to end the other call, thus the Calling Party Telephone System 330 signals (9B) the Called Party Telephone System 350. The Called Party Telephone system 350 ends the call with the Called Party User Agent 370. Depending on the phase of call setup, the Called Party User Agent may have started ringing. The call setup process ends.

Through signaling unique to the call diversion application 135 and its integrated systems, call diversion application 135 connects the media channels of the call between the Calling Party User Agent and the Call Completion System 140, allowing the calling party to communicate directly with that system (10), rather than with the Called Party.

Figure 4:
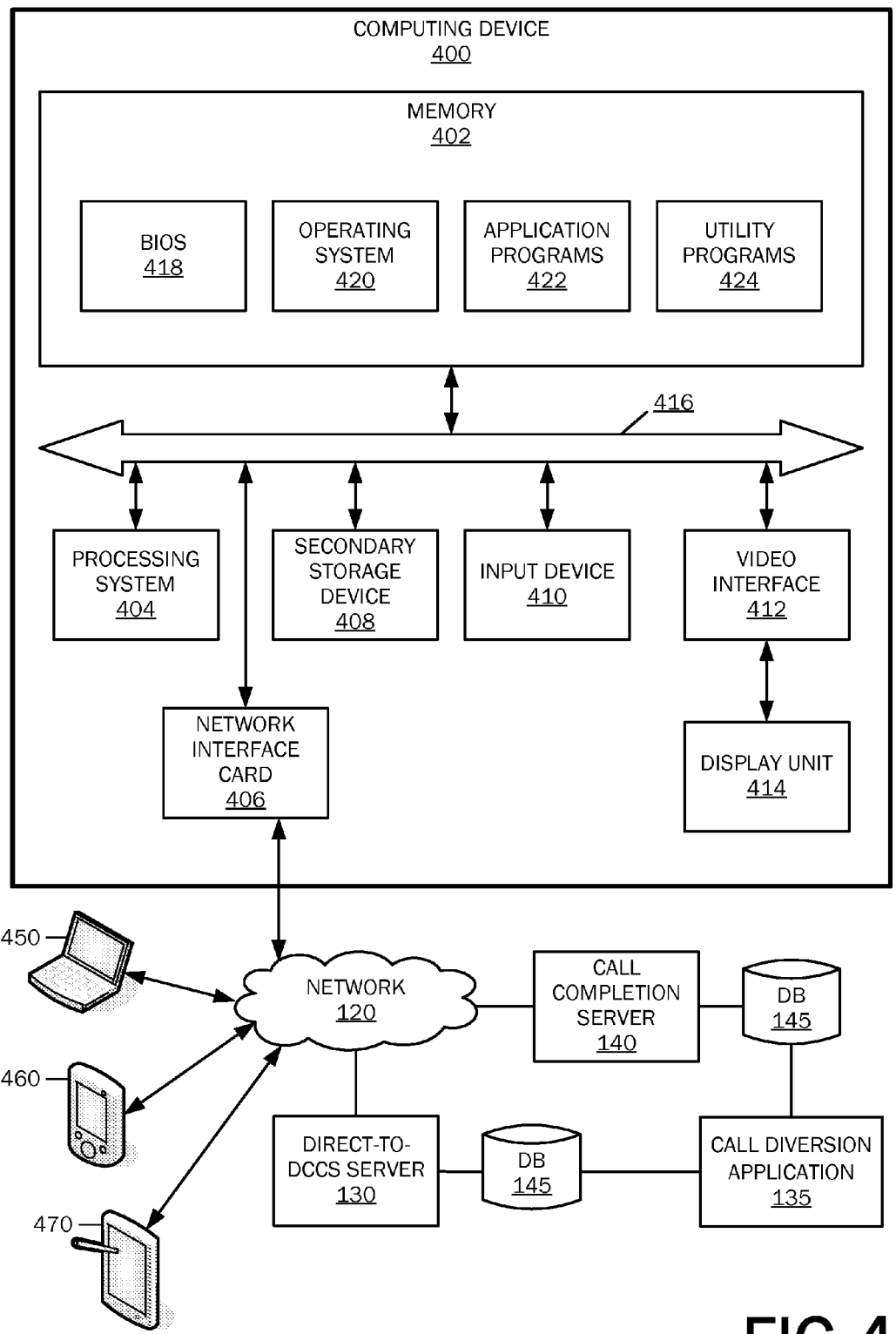
FIG. 4 is a block diagram illustrating example physical components of a computing device with which embodiments may be practiced and a system architecture for providing a call diversion application.

FIG. 4 illustrates an example computing device 400 with which embodiments of the present invention may be implemented. In some embodiments, the Direct-to-DCCS server 130, the call completion system server 140, and/or the call diversion application 135 may be implemented using one or more computing devices like the computing device 400. It should be appreciated that in other embodiments, the Direct-to-DCCS server 130, the call completion system server 140, and/or the call diversion application 135 may be implemented using computing devices having hardware components other than those illustrated in the example of FIG. 4.

Computing devices may be implemented in different ways in different embodiments. For instance, in the example of FIG. 4, the computing device includes a processing system 404, memory 402, a network interface 406, a secondary storage device 408, an input device 410, a video interface 412, a display unit 414, and a communication medium 416. In other embodiments, the computing device 400 may be implemented using more or fewer hardware components (e.g., a video interface, a display unit, or an input device) or in combination with other types of computer systems and program modules.

The memory 402 includes one or more computer-readable storage media capable of storing data and/or computer-executable instructions. Memory 402 thus may store the computer-executable instructions that, when executed by processor 404, cause the call diversion application 135 to direct a call to a call completion system 140 as described above with reference to FIGS. 1-3. Database 145 may store call profiles for providing call completion services.

In various embodiments, the memory 402 is implemented in various ways. For example, the memory 402 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 404 includes one or more processing units, which may include tangible integrated circuits that selectively execute computer-executable instructions. In various embodiments, the processing units in the processing system 404 are implemented in various ways. For example, the processing units in the processing system 404 can be implemented as one or more processing cores. In this example, the processing system 404 can comprise one or more Intel Core microprocessors. In another example, the processing system 404 can comprise one or more separate microprocessors. In yet another example embodiment, the processing system 404 can comprise Application-Specific Integrated Circuits (ASICs) that provide specific functionality. In yet another example, the processing system 404 provides specific functionality by using an ASIC and by executing computer-executable instructions.

The computing device 400 may be enabled to send data to and receive data from a communication network via a network interface card 406. In different embodiments, the network interface card 306 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 408 includes one or more computer-readable storage media, and may store data and computer-executable instructions not directly accessible by the processing system 404. That is, the processing system 404 performs an I/O operation to retrieve data and/or computer-executable instructions from the secondary storage device 408. In various embodiments, the secondary storage device 408 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 410 enables the computing device 400 to receive input from a user. Example types of input devices include, but are not limited to, keyboards, mice, trackballs, stylus input devices, key pads, microphones, joysticks, touch-sensitive display screens, and other types of devices that provide user input to the computing device 400.

The video interface 412 outputs video information to the display unit 414. In different embodiments, the video interface 412 is implemented in different ways. For example, the video interface 412 is a video expansion card. In another example, the video interface 412 is integrated into a motherboard of the computing device 400. In various embodiments, the display unit 414 can be a an LCD display panel, a touch-sensitive display panel, an LED screen, a projector, a cathode-ray tube display, or another type of display unit. In various embodiments, the video interface 412 communicates with the display unit 414 in various ways. For example, the video interface 412 can communicate with the display unit 414 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 416 facilitates communication among the hardware components of the computing device 400. In different embodiments, the communications medium 416 facilitates communication among different components of the computing device 400. For instance, in the example of FIG. 4, the communications medium 416 facilitates communication among the memory 402, the processing system 404, the network interface card 406, the secondary storage device 408, the input device 410, and the video interface 412. In different embodiments, the communications medium 416 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 418, and an operating system 420. The BIOS 418 includes a set of software instructions that, when executed by the processing system 404, cause the computing device 400 to boot up. The operating system 420 includes a set of software instructions that, when executed by the processing system 404, cause the computing device 400 to provide an operating system that coordinates the activities and sharing of resources of the computing device 400. The memory 402 also stores one or more application programs 422 that, when executed by the processing system 404, cause the computing device 400 to provide applications to users. The memory 402 also stores one or more utility programs 424 that, when executed by the processing system 404, cause the computing device 400 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 4 may be integrated onto a single integrated circuit. When operating via such a single integrated circuit, the functionality, described herein, with respect to the call diversion application 135 may be operated via application-specific logic integrated with other components of the computing device/system 400 on the single integrated circuit.

The Direct-to-DCCS server 130 may provide call completion information to client devices. As one example, server 130 may be a web server providing the call diversion application 135 over the web. Server 130 may provide call diversion over the web to clients through a network 120. Examples of clients that may obtain the completion service information include computing device 450, which may include any general purpose personal computer (such as computing device 400), a tablet computing device 470 and/or mobile computing device 460, such as smart phones.

Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

FIGS. 5A and 5B are block diagrams of a mobile computing device with which embodiments of the present invention may be practiced. The mobile computing device 500 is illustrative of any suitable device, such as a mobile telephone, personal digital assistant (PDA), or handheld computer, operative to send, receive and process wireless communications according to embodiments of the present invention. A display screen 505 is operative for displaying a variety of information such as information about incoming and outgoing communications, as well as, a variety of data and displayable objects, for example, text, alphanumeric data, photographs, and the like.

Data input to the device 500 may be performed via a variety of suitable means, such as, touch screen input via the display screen 505, keyboard or keypad input via a data entry area 510, key input via one or more selectable buttons or controls 515, voice input via a microphone 520 disposed on the device 500, photographic input via a camera 525 functionality associated with the mobile computing device, or any other suitable input means. Data may be output via the device 500 via any suitable output means, including but not limited to, display on the display screen 505, audible output via an associated speaker 530 or connected earphone system, vibration module for providing tactile output, and the like.

Referring now to FIG. 5B, operational unit 535 is illustrative of internal operating functionality of the mobile computing device 500. A processor 540 is illustrative of a general purpose computer processor for processing incoming and outgoing data and communications and controlling operation of the device and associated software applications via a mobile computing device operating system. Memory 545 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the call diversion application 135 may be stored locally on mobile computing device 500.

Mobile computing device 500 may contain an accelerometer 555 for detecting acceleration, and can be used to sense orientation, vibration, and/or shock. Mobile computing device 500 may contain a global positioning system (GPS) system (e.g., GPS send/receive functionality) 560. A GPS system 560 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 550 include all required functionality, including onboard antennae, for allowing the device 500 to communicate with other communication devices and systems via a wireless network. Radio functions 550 may be utilized to communicate with a wireless or WIFI-based positioning system to determine a device's 500 location.

Although described herein in combination with mobile computing device 500, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-5. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for a calling party to reach a system of a called party without reaching the called party, comprising:
receiving, via a device of the calling party, at a direct-to-diverted call completion service server, a request to bypass the called party and directly access a call diversion application;
in response to receiving the request from the device of the calling party, initiating, by the call diversion application at the direct-to-diverted call completion service server, a first call and a second call to the called party from a calling party telephone system associated with the device of the calling party;
detecting, while the first and second calls are in progress, when the second call is connected directly to a call completion system to bypass the called party; and
in response to detecting when the second call is connected directly to the call completion system, terminating the first call without providing the called party with an opportunity to take either of the first and second calls.

2. The method of claim 1, wherein the call diversion application comprises a diverted call completion system application.

3. The method of claim 1, wherein the initiating the first and second calls to the called party comprises initiating the two calls using a telephone system.

4. The method of claim 1, wherein the initiating the first and second calls to the called party comprises initiating the two calls using a handset.

5. The method of claim 1 further comprising connecting the second call to one call completion service selected from the group consisting of: a voicemail service; a videomail service, a fax deposit service, a text messaging service, and a voice to text service.

6. The method of claim 1, wherein the initiating the first and second calls to the called party further comprises creating a time interval between the first call and the second call.

7. The method of claim 1, wherein the detecting when the second call is connected to a call completion system further comprises inferring when the second call is connected to the call completion system based on one selected from: using signaling order, using timing between the first and second calls, using signaling content returned to the call diversion application, and analyzing audio content to determine when a ring tone is present in an audio channel of a call.

8. The method of claim 1, wherein the receiving, at a direct-to-diverted call completion service server, a request to access a call diversion application comprises receiving a request initiated using one of: an access code, a feature button on a special handset and a voice interaction session.

9. The method of claim 1, wherein the detecting when the second call is connected to a call completion system further comprises analyzing by the direct-to-diverted call completion service server signaling and messaging received from a user agent in response to the first and second call.

10. A system for enabling a calling party to reach a system of a called party without reaching the called party, comprising:
a communications network for providing call signaling and messaging to user communication devices; and
a direct-to-diverted call completion service server, coupled to the communications network, for receiving a request via a device of the calling party to access a call diversion application to directly connect the calling party to a call completion system of the called party without reaching the called party, wherein the call diversion application initiates a first call and a second call from a calling party telephone system associated with the device of the calling party to the called party in response to receiving the request, when the first and second calls are in progress detects when the second call is directly connected to a call completion system to bypass the called party and, in response to detecting when the second call is directly connected to the call completion system, terminates the first call without providing the called party with an opportunity to take either of the first and second calls.

11. The system of claim 10, wherein the call diversion application comprises a diverted call completion system application.

12. The system of claim 10, wherein the call diversion application initiates the first and second calls to the called party by initiating the two calls using a telephone system.

13. The system of claim 10, wherein the call diversion application initiates the first and second calls to the called party by initiating the two calls using a handset.

14. The system of claim 10, wherein the call diversion application connects the second call to one call completion service selected from the group consisting of: a voicemail service; a videomail service, a fax deposit service, a text messaging service, and a voice to text service.

15. The system of claim 10, wherein the call diversion application initiates the first and second calls to the called party and creates a time interval between the first call and the second call.

16. The system of claim 10, wherein the call diversion application detects when the second call is connected to a call completion system by inferring when the second call is connected to the call completion system based on one selected from: using signaling order, using timing between the first and second calls, using signaling content returned to the call diversion application, and analyzing audio content to determine when a ring tone is present in an audio channel of a call.

17. The system of claim 10, wherein the call diversion application receives a request to access a call diversion application initiated using one of: an access code, a feature button on a special handset and a voice interaction session.

18. The system of claim 10, wherein the call diversion application detects when the second call is connected to a call completion system by analyzing by the direct-to-diverted call completion service server signaling and messaging received from a user agent in response to the first and second call.

19. A computer readable storage device including executable instructions which, when executed by a processor, connects a calling party to a system of a called party without connecting with the called party, by:
receiving, via a device of the calling party, at a direct-to-diverted call completion service server, a request to bypass the called party and directly access a call diversion application;
in response to receiving the request from the device of the calling party, initiating, by the call diversion application at the direct-to-diverted call completion service server, a first call and a second call to the called party from a calling party telephone system associated with the device of the calling party;
detecting, while the first and second calls are in progress, when the second call is connected directly to a call completion system to bypass the called party; and
in response to detecting when the second call is connected to a call completion system, terminating the first call without providing the called party with an opportunity to take either of the first and second calls.

20. The computer readable storage device of claim 19, wherein the call diversion application comprises a diverted call completion system application.

\* \* \* \* \*